United States Patent
George et al.

(10) Patent No.: US 11,084,593 B2
(45) Date of Patent: Aug. 10, 2021

(54) ADDITIVE MANUFACTURED HEATER ELEMENTS FOR PROPELLER ICE PROTECTION

(71) Applicant: Goodrich Corporation, Charlotte, NC (US)

(72) Inventors: Adam George, Alliance, OH (US); Reid Philip Beery, Rittman, OH (US); James A. Mullen, Wadsworth, OH (US)

(73) Assignee: Goodrich Corporation, Charlotte, NC (US)

( * ) Notice: Subject to any disclaimer, the term of this patent is extended or adjusted under 35 U.S.C. 154(b) by 286 days.

(21) Appl. No.: 16/157,733

(22) Filed: Oct. 11, 2018

(65) Prior Publication Data

US 2020/0115059 A1    Apr. 16, 2020

(51) Int. Cl.
| | |
|---|---|
| *B64D 15/12* | (2006.01) |
| *H05B 3/00* | (2006.01) |
| *H05B 3/03* | (2006.01) |
| *H05B 3/12* | (2006.01) |
| *H05B 3/34* | (2006.01) |

(52) U.S. Cl.
CPC ........... *B64D 15/12* (2013.01); *H05B 3/0009* (2013.01); *H05B 3/03* (2013.01); *H05B 3/12* (2013.01); *H05B 3/34* (2013.01); *H05B 2203/013* (2013.01); *H05B 2203/017* (2013.01)

(58) Field of Classification Search
CPC .......... H05B 3/03; H05B 3/0009; H05B 3/34; H05B 3/12; H05B 2203/013; H05B 2203/017

USPC ................................. 219/203, 543, 548, 552
See application file for complete search history.

(56) References Cited

U.S. PATENT DOCUMENTS

| | | | |
|---|---|---|---|
| 8,367,986 B2 | 2/2013 | Von Wachenfeldt et al. | |
| 8,481,898 B2 | 7/2013 | Parker | |
| 9,771,158 B2 | 9/2017 | Gilmore et al. | |
| 2006/0278631 A1* | 12/2006 | Lee | H05B 3/342 |
| | | | 219/529 |
| 2008/0083740 A1* | 4/2008 | Kaiserman | A43B 7/04 |
| | | | 219/520 |
| 2008/0099617 A1 | 5/2008 | Gilmore et al. | |
| 2010/0096507 A1 | 4/2010 | Villinger | |
| 2011/0147369 A1 | 6/2011 | Spooner et al. | |
| 2014/0138490 A1 | 5/2014 | Botura et al. | |

(Continued)

FOREIGN PATENT DOCUMENTS

| | | |
|---|---|---|
| GB | 2551250 A | 12/2017 |
| JP | 2011238559 A * | 11/2011 |

(Continued)

OTHER PUBLICATIONS

Extended European Search Report for EP Application No. 19201958. 6, dated Dec. 10, 2019, pp. 7.

(Continued)

*Primary Examiner* — Thien S Tran
(74) *Attorney, Agent, or Firm* — Kinney & Lange, P.A.

(57) ABSTRACT

An additively manufactured heating element is printed on a flexible substrate and attached to an aircraft component having a complex geometric surface. The heating element is made of a plurality of layers of a conductive ink, which is electrically connected to a controller through one or more leads.

15 Claims, 2 Drawing Sheets

(56) References Cited

U.S. PATENT DOCUMENTS

| | | | |
|---|---|---|---|
| 2016/0007474 A1* | 1/2016 | Dardona | H05B 3/06 |
| | | | 219/543 |
| 2017/0273144 A1 | 9/2017 | Callot et al. | |
| 2017/0298760 A1 | 10/2017 | Vallino | |
| 2018/0014357 A1* | 1/2018 | Christy | C01B 32/158 |
| 2018/0070411 A1* | 3/2018 | Wei | H05B 3/86 |
| 2018/0186460 A1 | 7/2018 | Dardona et al. | |

FOREIGN PATENT DOCUMENTS

| | | |
|---|---|---|
| WO | WO2007039747 A1 | 4/2007 |
| WO | WO2017147480 A1 | 8/2017 |

OTHER PUBLICATIONS

Communication Pursuant to Article 94(3) EPC for EP Application No. 19201958.6, dated Dec. 9, 2020, pp. 5.

\* cited by examiner

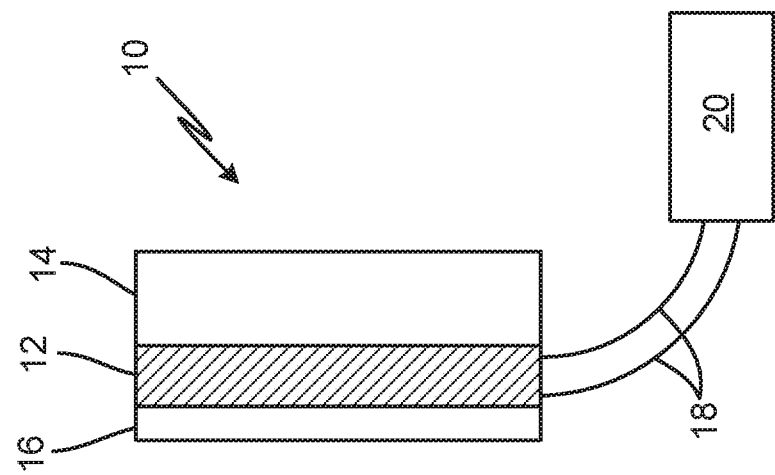
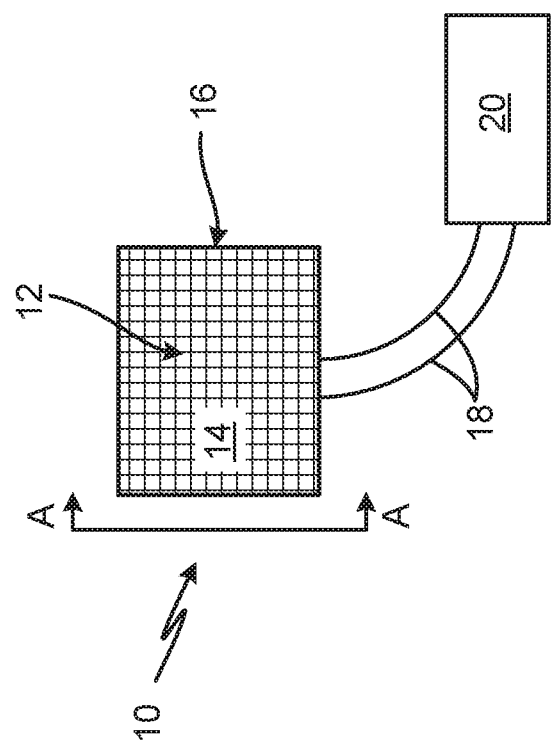

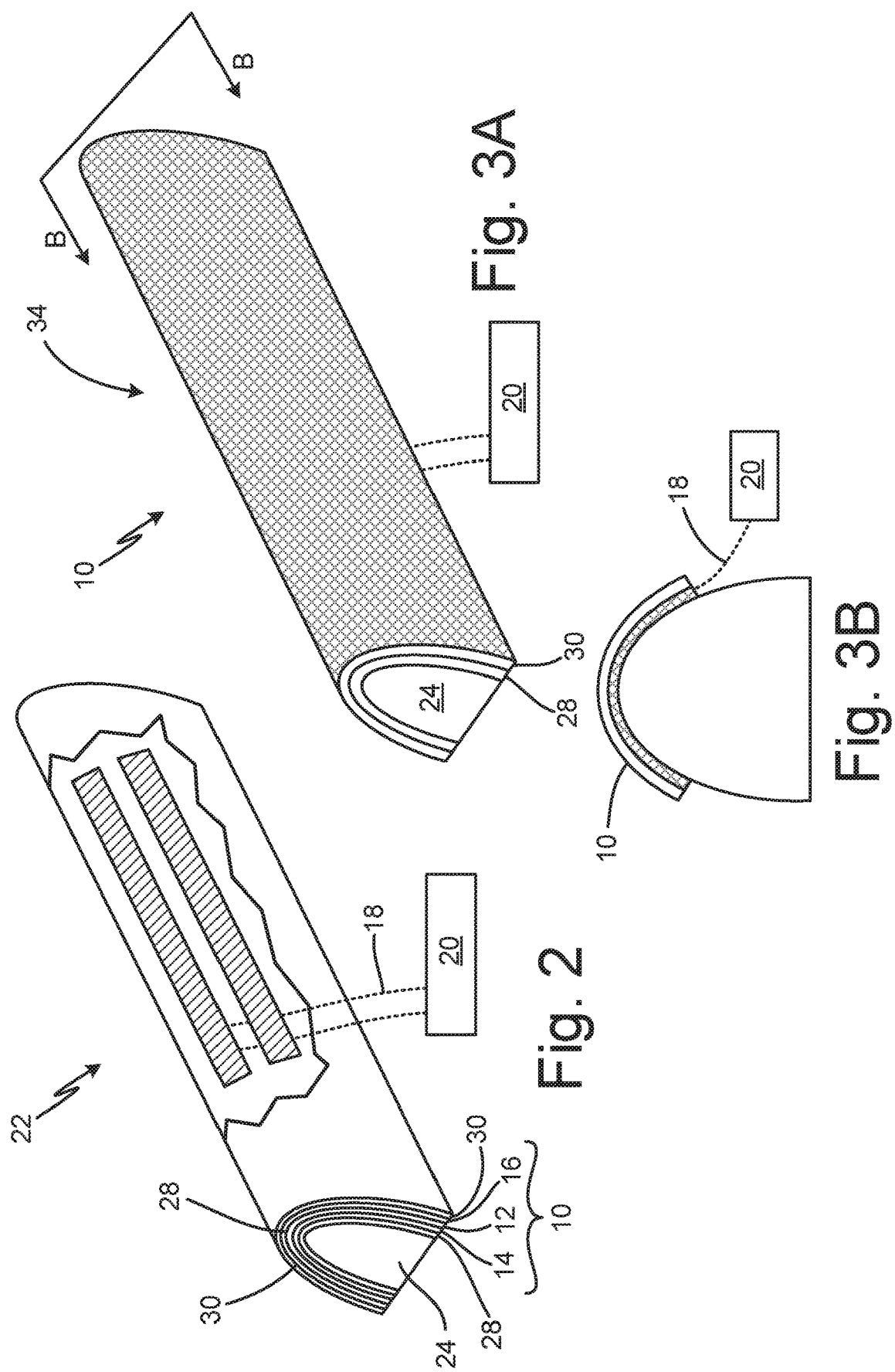

ADDITIVE MANUFACTURED HEATER ELEMENTS FOR PROPELLER ICE PROTECTION

BACKGROUND

This application relates generally to aircraft ice protection heater elements, and specifically to additive manufactured heater elements.

Many aircraft components require heating to prevent and minimize ice formation. Specifically, prior art propeller ice protection heaters are wire wound or etched metal foil. Wire wound heaters are time intensive to build. Etched metal foil heaters are made through a wasteful and environmentally unfriendly process that is difficult to control and produces large amounts of scrap. Alternative ice protection heaters have been made with conventional printed circuits, which require a rigid, high energy substrate not suitable for complex geometries or high fatigue environments associated with propeller ice protection.

SUMMARY

In a first embodiment, an assembly includes a component requiring heating, a flexible substrate on the component, a heating element on the flexible substrate, one or more leads electrically connected to the heating element, and a controller electrically connected to the heating element through the one or more leads. The heating element is additively manufactured such that it includes a plurality of layers of a conductive ink.

In a second embodiment, a heater includes a flexible substrate and a heating element thereon, the heating element comprising a plurality of layers of conductive ink.

In a third embodiment, a method of making a heater includes additively manufacturing a conductive ink structure having a plurality of layers onto a flexible substrate to make a heating element, electrically connecting the heating element with one or more leads, and attaching the flexible substrate with the heating element to a component surface.

BRIEF DESCRIPTION OF THE DRAWINGS

FIGS. 1A-1B are schematic diagrams of an additively manufactured heater.

FIG. 2 is a schematic diagram of an additively manufactured heater in a propeller.

FIGS. 3A-3B are schematic diagrams of an additively manufactured heater in a propeller in a second embodiment.

DETAILED DESCRIPTION

Flexible additive manufactured ice protection heaters suitable for propeller and other aircraft component applications can be made by additively manufacturing conductive ink on a flexible substrate. When additively manufactured on a flexible substrate such as a neoprene, TPU, urethane, or fabric, these conductive inks can be integrated into elastomeric propeller ice protection components that will conform and flex to the propeller blade. Alternatively, a heating element made of conductive ink can be directly additively manufactured onto the surface of a propeller through methods such as aerosol jet or ink-jet printing processes.

FIGS. 1A-1B are schematic diagrams of additively manufactured heater 10, and will be discussed together. FIG. 1A is a top-down view of heater 10, while FIG. 1B is a side view of heater 10 along line A-A. Heater 10 includes conductive ink 12 on substrate 14 covered by encapsulating material 16. Conductive ink 12 is electrically connected by leads 18 to controller 20.

Heater 10 is a three-dimensionally additively manufactured device made of conductive ink 12 with a resistivity range of 10.4 to 620 circular MIL ohm per foot, depending on the size and specific application of heater 10. Conductive ink 12 can have a thickness between approximately 0.0001 inches and 0.010 inches.

Conductive ink 12 makes up the additively manufactured, heating portion of heater 10. Conductive ink 12 can be a carbon loaded, nano-carbon loaded, or nano-silver loaded ink and can be up to 70% loaded with carbon (or silver) particles. In other embodiments, conductive ink 12 can be up to 60% loaded, or at least up to 50% loaded. Conductive ink 12 can be, for example, commercially available inks such as Loctite® CT 5030, Loctite® Ablestik® 8008MD, Loctite® EDAG 6017SS, or Loctite® EDAG 725A from Loctite, Bonderite® S-FN 109 available from Henkel, DuPont® PE671, DuPont® PE873, or DuPont® PE410 from DuPont USA.

Alternatively, conductive ink 12 can be a positive temperature coefficient (PTC) ink. PTC heaters are self-regulating heaters that run open-loop without any external diagnostic controls. Positive temperature coefficient heaters come to full power and heat up quickly to optimum temperature, but as heat increases, power consumption drops. This dynamic type of heater is effective and time and energy efficient. Thus, heater 10 made with PTC conductive ink 12 does not require an outside temperature control. Examples of PTC inks include DuPont® 7292 available from DuPont or Henkel® EC1 8060 available from Henkel.

The conductive ink 12 of heater 10 is formulated to allow highly detailed precision printing, and maintain a high resistance without bleeding between adjacent additively manufactured lines. Conductive ink 12 is additively manufactured onto substrate 14 through a printing process such as screen printing, ink-jet, aerosol-jet printing, or other processes known to provide similar printing capabilities.

Substrate 14 can be, for example, a flexible substrate on which conductive ink 12 is additively manufactured. Appropriate materials include neoprene, nylon fabric, glass fabric, pre-impregnated fabric (containing a resin), urethane, or other similar materials. Alternatively, conductive ink 12 can be additively manufactured directly onto the surface of the component which heater 10 will heat.

Conductive ink 12 is sealed to substrate 14 (or the surface of the component) by encapsulating material 16, which protects conductive ink 12 from external contaminants and dielectric failure. Encapsulating materials can include neoprene, nylon fabric, glass fabric, pre-impregnated fabrics, urethane, or other materials that will electrically isolate conductive ink 12 from the external environment.

In either case, leads 18 create an electrical connection between conductive ink 12 and controller 20. Leads 18 can be conventional wires, or can be additively manufactured like conductive ink 12.

Controller 20 is in communication with heater 10 via leads 18. Controller 20 powers heater 10 ON and OFF based on preset ON and OFF times, or based on temperature feedback from a temperature sensor (not shown).

Controller 20 can include one or more processors and controller-readable memory encoded with instructions that, when executed by the one or more processors, cause controller 20 to operate in accordance with techniques described herein. Examples of the one or more processors include any one or more of a microprocessor, a digital signal processor (DSP), an application specific integrated circuit (ASIC), a field-programmable gate array (FPGA), or other equivalent discrete or integrated logic circuitry. Controller-readable memory of controller 20 can be configured to store information within controller 20 during operation. The controller-readable memory can be described, in some examples, as controller-readable storage media. In some examples, a controller-readable storage medium can include a non-transitory medium. The term "non-transitory" can indicate that the storage medium is not embodied in a substrate wave or a propagated signal. In certain examples, a non-transitory storage medium can store data that can, over time, change (e.g., in RAM or cache). Controller-readable memory of controller 20 can include volatile and non-volatile memories. Examples of volatile memories can include random access memories (RAM), dynamic random access memories (DRAM), static random access memories (SRAM), and other forms of volatile memories. Examples of non-volatile memories can include magnetic hard discs, optical discs, floppy discs, flash memories, or forms of electrically programmable memories (EPROM) or electrically erasable and programmable (EEPROM) memories. Controller 20 can be a stand-alone device dedicated to the operation of the catalytic oxidation unit, or it can be integrated with another controller.

In operation, heater 10 converts electrical input to thermal output on the surface of substrate 14 to heat the component on which heater 10 rests. Additively manufacture heater 10 can also be applied to geometrically complex surfaces. Because present ink technologies are often limited by their ability to carry electrical current, the subject invention is best suited for applications that require lower power densities (<10 watts per square inch), such as propellers.

Conductive ink 12 can be manufactured, for example, on a flexible substrate such as substrate 14. Flexible substrate 14 must be able to conform to the curvature of the component surface to which heater 10 will be applied. The materials for substrate 14 are discussed above. In some instances, the substrate must be cleaned or cured before printing using conventional curing methods.

Substrate 14 must be compatible with both the component and conductive ink 12 used to make the heating element and can be a low energy substrate material. For instance, flexible substrate 14 must be able to withstand heating occurring with the component, and maintain adhesion to the component. This is highly dependent on the specific component and conductive ink 12 chosen. For example, if the component is a propeller blade, flexible substrate 14 must be able to withstand light, temperature, and weather external to the aircraft.

Next, conductive ink 12 is additively manufactured onto substrate 14 in layers to form heater 10. Examples of commercially available conductive inks are discussed above. Typically, ink-jet, aerosol-jet, or screen printing can be used depending on the type of ink chosen, desired layer thickness, and dimensions of heater 10. For two dimensional printing on a substrate using screen printing, the screen specifications such as mesh count, size, and material are selected based on conductive ink 12 being used, the desired thicknesses of conductive ink 12 required to be additive manufactured, and the substrate to be additive manufactured on.

For ink-jet and aerosol-jet methods, the print head should be moveable at least on (x, y, z) axes and programmable with the geometric pattern specific to the component on which conductive ink 12 will be applied. The specific print head and additively manufacturing method will be dependent on the exact ink formulations and requirements set forth by the manufacturer of the ink. Ink-jet and aerosol-jet printers and printing heads can be utilized for two dimensional applications, such as printing on a substrate, but ideally can be adapted to enable three dimensional printing capabilities by attaching the printing heads onto a numerically controlled robotic arm. For example, three dimensional ink-jet and aerosol-jet printing equipment developed by Ultimaker (three dimensional ink-jet equipment) or Optomec (three dimensional aerosol-jet equipment) can be used. For ink-jet or aerosol-jet methods, the printing head temperatures, flow rates, nozzle sizes are also selected based on the conductive ink being additive manufactured, required conductive ink thickness, and substrate to be additive manufactured on.

The printing is accomplished in an additive manner, meaning the print head takes one or more passes before a desired heater element resistance is reached in the desired geometric pattern and desired dimensions, which matches the curvature of the component. Alternatively, substrate 14 can be a rigid substrate already shaped so that it conforms to the geometric surface of the component to which it will be applied. In this case, the additive manufacturing of conductive ink 12 must follow a three-dimensional print pattern.

Conductive ink 12 of the additively manufactured heater element should have a thickness of approximately between 0.0001"-0.010". Multiple passes are done by the print head when applying conductive ink 12. Each layer deposited through individual passes of the print head should have a thickness of approximately 1-100 microns. Multiple passes allows for slow buildup of conductive ink 12 to the correct resistance and geometric pattern. Additionally, multiple passes allows for tailoring of conductive ink 12 on certain portions of the component surface. For instance, conductive ink 12 with a lower resistance (e.g., with a higher number of layers) and a greater thickness may be additively manufactured on a first portion of the component compared to a second portion of the component.

After additively manufacturing the heating element, conductive ink 12 is cured, and leads 18 are connected to conductive ink 12. The curing process of additively manufactured conductive ink 12 depends on the type of conductive ink 12 used. In some instances, conductive ink 12 will air dry. In other instances, heat, infrared exposure, UV exposure, or other methods can be used to cure conductive ink 12.

After conductive ink 12 is additively manufactured onto substrate 14, it may be encapsulated with a dielectric material, such as acrylic, neoprene, polyurethane, silicone, or an epoxy-fiberglass matrix, to prevent erosion and electrical shorting. For example, encapsulating materials with high dielectric strength may only be required to be 0.001" thick while materials with lower dielectric strength, such as polyurethane or neoprene rubber, may be as thick as 0.015-0.060". Encapsulating material 16 can then be cured through conventional methods.

Finally, heater 10 may be applied to the component surface with an adhesive such as a cement adhesive (for application to a propeller blade or other surface), depending on the component and environment requirements. The flexible substrate 14 allows for conforming of heater 10 to curvature of the component surface, to which it is applied, without creating unnecessary internal stresses.

Alternatively, conductive ink 12 is additively manufactured directly onto the component surface. If conductive ink 12 is additive manufactured directly onto the component surface, the printing method used must allow for a print head that can move in three dimensions and navigate the geometry of the component surface while printing. Like the first method, the print head will make multiple passes until the resistance and thickness of conductive ink 12 is correct. Methods such as screen printing, ink-jet or aerosol-jet printing can be used, the method would be selected based on the complexity of the shape on which conductive ink 12 is being additive manufactured. In some instances, the component surface must be primed or prepared prior to printing of conductive ink 12. The printing process is similar to that described in reference to the first embodiment, but the print head in this embodiment follows a predetermined three-dimensional program to print on the surface of the component. Once additive manufactured, conductive ink 12 must be electrically connected, encapsulated, and cured as discussed above.

In some instances, where the assembly surface is electrically conductive (metallic), this necessitates the use of an intermediary dielectric layer between the assembly and additively manufactured conductive ink 12, such as a non-conductive ink like DuPont BQ10 or ME777 available from DuPont USA, or an integrally bonded layer such as an epoxy-fiberglass. The typical thickness of a dielectric layer depends on the dielectric strength of the material and as a result may vary between 0.0005" and 0.010" thick. The dielectric layer is not necessary for certain types of composite surfaces. This dielectric layer is thin, and acts as an insulator and adhesive between the component surface and the additively manufactured conductive ink 12. The dialectic layer, like the flexible substrate in the first embodiment, must be able to withstand temperatures, light, and other environmental factors so that heater 10 maintains its adhesion to the component.

In any method of heater 10, heater 10 adheres to and matches the geometry of the surface of the component to which it is applied. This allows for greater fatigue resistance over the lifespan of the component and heater 10. Moreover, multiple applications of conductive ink 12 allows for varying thickness and resistance of the heating element as needed on the component. Various embodiments of heater 10 integrated within components are discussed with reference to FIG. 2.

FIG. 2 is a schematic diagram of heater 10 integrated within propeller assembly 22. Propeller assembly 22 has, from inside to outside, core 24, structural plies 28, heater 10, erosion shield 30, leads 18 and controller 20.

Component assembly 22 is a propeller for aircraft with a curved surface. Core 24 and structural plies 28 make up the internal structure of component 22, providing structural support. Core 24 can be, for example, metal, wood, foam, fiberglass, or other material suitable to support propeller assembly 22. Erosion shield 30 protects all of assembly 22, including heater 10, from the external environment.

Heater 10 internally heats component 22, and can be any embodiment aforementioned above. In FIG. 2, heater 10 is pictured with substrate 14, conductive ink 12, and encapsulating layer 16 sandwiched between structural layers 28 and erosion shield 30 of assembly 22. The layers of heater 10 are compiled and additively manufactured during the assembly of propeller assembly 22. In this way, the parts of heater 10 (substrate 14, conductive ink 12, encapsulating layer 16) are layers of propeller assembly 22. Embedded in the middle of assembly 22, heater 10 is electrically connected to controller 20 via leads 18, and protected from external and environmental factors.

Conductive ink 12 of heater 10 can be printed with varying resistance. For example, in a first portion of heater 10, conductive ink 12 can have a higher power density. In a second portion of heater 10, conductive ink 12 can have a lower power density. This can be tailored depending on power density needs across the component requiring heating. Additionally, additive manufactured ice protection heating elements can be printed in complex geometric patterns, such as redundant paths or patterns that increase resistance to foreign object damage.

FIGS. 3A-3B are schematic diagrams of an additively manufactured heater 10 on propeller 34 in a second embodiment, and will be discussed together. FIG. 3A is a perspective view of propeller assembly 34, while FIG. 3B is a cross sectional view along line B-B of FIG. 3A. Propeller assembly 34 contains core 24, structural layers 28, and erosion shield 30, in addition to heater 10, leads 18, and controller 20. These are many of the same components as those in FIG. 2. Varying components will be discussed in depth.

In assembly 34, heater 10 is additively manufactured conductive ink 12 on the curved surface of and conforming to the geometry of assembly 34. Alternatively, conductive ink 12 can reside on a flexible substrate which is attached to the curvature of assembly 34. Leads 18 connect heater 10 to an electrical source and allow for communication with a controller as heater 10 heats the surface of assembly 34. As discussed with reference to FIG. 2, conductive ink 12 can be printed with varying resistance.

High flexure, composite propeller blades are common. Evidence supports additive manufactured ice protection heating elements on flexible substrates may offer greater fatigue resistance on these types of propeller blades. Finally, additive manufactured ice protection heating elements are lighter weight than traditional wound wire or etched metallic heating elements.

Discussion of Possible Embodiments

The following are non-exclusive descriptions of possible embodiments of the present invention.

An assembly includes a component requiring heating, a flexible substrate on the component, a heating element on the flexible substrate, one or more leads electrically connected to the heating element, and a controller electrically connected to the heating element through the one or more leads. The heating element is additively manufactured such that it includes a plurality of layers of a conductive ink.

The assembly of the preceding paragraph can optionally include, additionally and/or alternatively, any one or more of the following features, configurations and/or additional components:

The component comprises a propeller.

The flexible substrate is selected from the group consisting of neoprene, TPU, urethane, glass fabric, pre-impregnated fabric, and combinations thereof.

The heating element is selected from the group consisting of conductive inks loaded with metallic materials, metallic alloys, composite materials, carbon allotropes, and combinations thereof.

The heating element is encapsulated with a dielectric material selected from the group consisting of acrylic, neoprene, polyurethane, silicone, and an epoxy-fiberglass matrix.

A heater includes a flexible substrate and a heating element thereon, the heating element comprising a plurality of layers of conductive ink.

The heater of the preceding paragraph can optionally include, additionally and/or alternatively, any one or more of the following features, configurations and/or additional components:

The heating element has a resistance between 0.1 ohms and 60 ohms.

The heating element has a resistance between 2 ohms and 5 ohms.

The heating element has a thickness between 0.0001 inches and 0.010 inches.

The conductive ink contains loaded particles selected from the group consisting of carbon, nano-carbon, and nano-silver particles.

The conductive ink contains up to 70% loaded particles.

The conductive ink contains up to 60% loaded particles.

The conductive ink contains up to 50% loaded particles.

A method of making a heater includes additively manufacturing a conductive ink structure having a plurality of layers onto a flexible substrate to make a heating element, electrically connecting the heating element with one or more leads, and attaching the flexible substrate with the heating element to a component surface.

The heater of the preceding paragraph can optionally include, additionally and/or alternatively, any one or more of the following features, configurations and/or additional components:

The method includes encapsulating the heating element.

The conductive ink structure comprises carbon, nano-carbon, or nano-silver particles.

Additively manufacturing comprises screen printing, ink-jet printing, or aerosol-jet printing.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly comprising:
   a component requiring heating, wherein the component has a curved surface;
   a flexible substrate on the component;
   a heating element on the flexible substrate which adheres to and matches the geometry of the curved surface of the component, wherein the heating element is additively manufactured such that it includes a plurality of layers of a conductive ink containing loaded particles selected from the group consisting of carbon, nano-carbon, and nano-silver particles, the heating element has a thickness between 0.0001 inches and 0.010 inches and includes a first portion with a first power density and a second portion with a second power density that is different than the first power density, and the plurality of layers of the conductive ink are arranged in a geometric pattern configured to provide redundant paths;
   one or more leads electrically connected to the heating element; and
   a controller electrically connected to the heating element through the one or more leads.

2. The assembly of claim 1, wherein the component comprises a propeller.

3. The assembly of claim 1, wherein the flexible substrate is selected from the group consisting of neoprene, TPU, urethane, glass fabric, pre-impregnated fabric, and combinations thereof.

4. The assembly of claim 1, wherein the heating element is selected from the group consisting of conductive ink loaded with metallic materials, metallic alloys, composite materials, carbon allotropes, and combinations thereof.

5. The assembly of claim 1, wherein the heating element is encapsulated with a dielectric material selected from the group consisting of acrylic, neoprene, polyurethane, silicone, and an epoxy-fiberglass matrix.

6. A heater for a component with a curved surface, the heater comprising:
   a flexible substrate; and
   a heating element thereon which adheres to and matches the geometry of the curved surface of the component, the heating element comprising a plurality of layers of conductive ink containing loaded particles selected from the group consisting of carbon, nano-carbon, and nano-silver particles, wherein the heating element has a thickness between 0.0001 inches and 0.010 inches and includes a first portion with a first power density and a second portion with a second power density that is different than the first power density, and wherein the plurality of layers of the conductive ink are arranged in a geometric pattern configured to provide redundant paths.

7. The heater of claim 6, wherein the heating element has a resistance between 0.1 ohms and 60 ohms.

8. The heater of claim 7, wherein the heating element has a resistance between 2 ohms and 5 ohms.

9. The heater of claim 6, wherein the conductive ink contains up to 70% loaded particles.

10. The heater of claim 9, wherein the conductive ink contains up to 60% loaded particles.

11. The heater of claim 10, wherein the conductive ink contains up to 50% loaded particles.

12. A method of making a heater comprising:
    additively manufacturing a conductive ink structure having a plurality of layers onto a flexible substrate to make a heating element, wherein the heating element has a thickness between 0.0001 inches and 0.010 inches and includes a first portion with a first power density and a second portion with a second power density that is different than the first power density, and wherein the plurality of layers of the conductive ink are arranged in a geometric pattern configured to provide redundant paths;
    electrically connecting the heating element with one or more leads; and
    attaching the flexible substrate with the heating element to a component surface wherein the component surface is curved and the flexible substrate with the heating element adheres to and matches the geometry of the component surface.

13. The method of claim 12, further comprising encapsulating the heating element.

14. The method of claim 12, wherein the conductive ink structure comprises carbon, nano-carbon, or nano-silver particles.

15. The method of claim 12, wherein additively manufacturing comprises screen printing, ink-jet printing, or aerosol-jet printing.

* * * * *